United States Patent [19]

Takagi

[11] Patent Number: 4,461,736
[45] Date of Patent: Jul. 24, 1984

[54] METHOD OF PRODUCING A DAM FOR A COMMUNICATION CABLE

[75] Inventor: Seiji Takagi, Ichihara, Japan

[73] Assignee: The Furukawa Electric Co., Ltd., Tokyo, Japan

[21] Appl. No.: 336,364

[22] PCT Filed: Apr. 14, 1981

[86] PCT No.: PCT/JP81/00088
§ 371 Date: Dec. 14, 1981
§ 102(e) Date: Dec. 14, 1981

[87] PCT Pub. No.: WO81/03085
PCT Pub. Date: Oct. 29, 1981

[51] Int. Cl.³ .............................................. B29D 27/04
[52] U.S. Cl. ................................... 264/46.5; 156/48;
174/23 R; 174/23 C; 249/160; 264/46.9;
264/271.1; 264/279.1
[58] Field of Search ................... 264/46.5, 46.9, 271.1,
264/272.11, 279, 279.1; 156/48, 49, 79, 381;
174/23 R, 23 C

[56] References Cited

U.S. PATENT DOCUMENTS

| | | |
|---|---|---|
| 2,320,506 | 6/1943 | Bennett et al. ............... 174/23 R X |
| 2,957,038 | 10/1960 | Greenidge et al. ............... 174/23 R |
| 3,427,393 | 2/1969 | Masterson ........................... 174/23 R |
| 3,582,533 | 6/1971 | Albright et al. ............... 264/46.5 X |
| 3,710,440 | 1/1973 | Nevin et al. ....................... 156/48 X |
| 3,872,233 | 3/1975 | Rocton ............................. 174/23 R |
| 3,955,043 | 5/1976 | Palmer et al. ................. 264/46.9 X |
| 3,992,569 | 11/1976 | Hankins et al. .................. 156/49 X |

FOREIGN PATENT DOCUMENTS

| | | |
|---|---|---|
| 235881 | 5/1960 | Australia .............................. 156/48 |
| 2328633 | 1/1974 | Fed. Rep. of Germany . |
| 1956497 | 3/1978 | Fed. Rep. of Germany . |
| 49-61691 | 6/1974 | Japan . |
| 50-4251975 | 1/1975 | Japan . |
| 53-47509 | 12/1978 | Japan . |
| 26769 | 6/1972 | United Kingdom . |

OTHER PUBLICATIONS

Masterson, J. B., "Pressure Dams in Communication Cables", in *Wire & Wire Products*, May 1970, pp. 61–65.
Bender, Rene J., *Handbook of Foamed Plastics*, Libertyville, Ill., Lake Publishing Corp., © 1965, p. 166.

*Primary Examiner*—Philip E. Anderson
*Attorney, Agent, or Firm*—Pearne, Gordon, Sessions, McCoy, Granger & Tilberry

[57] ABSTRACT

This invention relates to a method of producing a dam comprising the steps of exposing transmission members 4 by stripping the sheath 3 of a communication cable, covering the exposed portions of the transmission members 4 with a mold 5 and injecting self-curing resin 2 into the mold 5 to cure it. A resin which is cured while being foamed is used as the self-curing resin. The resin 2 is foamed in the mold after being injected into the mold while it is still not foamed. The resin 2 has the pressure increased by increasing the fluidity resistance of the resin 2 as it progresses to be cured when the resin 2 intrudes into gaps between the transmission members 4 within the sheath 3, which is caused by an expansion of volume of the resin 2 during foaming whereby the resin 2 is cured under a high pressure. According to the invention, it is possible to produce a gas-tight dam in a much shorter time and also an interference in the gaps for the dam resin is not required to be provided or is much simpler, with the result that the productivity can be much improved.

8 Claims, 1 Drawing Figure

METHOD OF PRODUCING A DAM FOR A COMMUNICATION CABLE

DESCRIPTION

1. Technical Field

This invention relates to a method of producing a dam for a communication cable, and more particularly to a method of forming a gas-tight or water-tight dam by filling a portion of the communication cable with resin.

2. Background Art

In general, there has been employed a method of maintaining an underground laid communication cable in which a gas having a pressure higher than atmospheric pressure is filled in the communication cable in order to prevent water or moisture from intruding into the cable through a damaged portion of its sheath. Meanwhile, an aerially laid communication cable is not provided with the aforementioned gas maintenance means. A gas-tight dam is provided at the portion of the cable which extends upwardly from the underground laid cable to the aerially laid cable so as to prevent the gas in the former cable from flowing into the aerially laid cable.

In the case of a communication cable having no gas maintenance, water or moisture intruding into the cable through a damaged portion thereof diffuses in a longitudinal manner so that the cable is not able to be used along a large portion of its length. In order to prevent this, moisture-tight dams have been provided at intervals so that the damage does not spread beyond the distance between the adjacent dams.

Furthermore, in the case of the communication cable drawn into a feeder distribution interface, water or moisture intruding into the cable through the damaged sheath portion intrudes through the cable into the feeder distribution interface where it corrodes connectors in the interface. To prevent this, a moisture-tight dam has been provided at the place where the communication cable is introduced into the feeder distribution interface.

In the prior art, such dams for communication cables have been formed at the actual sites where the communication cables are laid. However, since the environment for operation varies widely at the actual sites, it is difficult to form the dams reliably in their gas or water tightness. Therefore, of late, dams have been formed at the portion or portions of the communication cables in factories where the enviroment for operation is better controlled. In this case, the products have been taken up on drums in the form of communication cable having a dam provided therein.

In order to make such a communication cable having a dam provided therein, exposed portions of insulated conductors of the communication cable which are formed by stripping the sheath (and which may be connected portions of the insulated conductors) are covered with a mold which is placed between the ends of the sheath portions on both sides of the exposed portions of the insulated conductors. Resin is injected into the mold so that the gaps or interstices among the insulated conductors are filled with the resin. Thereafter, the resin is cured so as to form a dam in the communication cable. The resin for the dam may be polyethylene, epoxy resin, urethane resin and so on.

In case that polyethylene is used as the dam resin, it takes substantial time to preheat and chill the mold at every cycle because of the large volume of the product to be formed, and also it is required to chill the mold while it is pressurized so that voids are never formed within the product. As a result, it takes 3 to 5 hours until the mold is removed from the communication cable, which reduces the productivity. In case that epoxy resin is used as dam resin, the curing reaction must be delayed to control heat so that insulators (which are usually composed of polyethylene) for the conductors are never melted by the heat generated from the curing reaction. Thus, it takes 8 to 24 hours after the resin is injected until the mold is removed, which also causes a reduced productivity. In comparison with this, since urethane resin generates less heat than epoxy resin on curing, it can be cured at a higher speed, but it has a problem of gas-tightness because it has no adhesion to polyethylene from which the insulators for the conductors are made.

In addition thereto, in the prior method of producing a dam, it has been required to provide an interference near and within the sheath ends to prevent the injected resin from being introduced through the conductor gaps or interstices into the sheath portions. Such an interference has been provided by filling the conductor gaps at the sheath ends with putty material or fiber material. However, since the insulated conductors are entangled or twisted and, this has been manually made, which causes the operation to be troublesome.

DISCLOSURE OF THE INVENTION

According to this invention, self-curing resin is used as the dam resin. The self-curing resin is foamed in a mold after being injected while it is still not foamed. This resin is cured under a high pressure of the resin in the mold, which is caused by the fact that a viscosity or fluidity resistance of the resin is increased as it progresses to be cured when the resin intrudes into the gaps between transmission members (such as insulated conductors) within a sheath by its volume expansion on foaming the resin.

In case that the dam is formed without an interference for the dam resin provided at the sheath ends, if the dam resin injected into the mold is in the fluid state for substantial time, then it is introduced through the transmission member gaps into the sheath portions. This causes what is called "sinking" to be produced in the dam, and as a result, it is not able to produce the dam having a good gas-tightness. Conversely, if the dam resin is cured at higher speed so that it is cured before flowing into the gaps between the transmission members, then a good dam cannot be formed. Thus, in order to form the dam without an interference provided at the sheath ends, the dam resin has to be allowed to flow and some degree into the transmission member gaps in the sheath portions. Since the length of the cable along which the dam resin flows into the sheath portions should not prevent the flexibility of the cable which is required near the dam, it may be about 20 to 80 mm although it depends on the type of the cable. Meanwhile, if the dam resin is allowed to flow into the sheath portions, then the amount of the resin in the mold decreases so that there remains the problem of "sinking" as aforementioned.

Accordingly, in this invention, there is essentially used as a dam resin, self-curing resin which is fluid when injected into a mold, but cured while it is foamed after injected into the mold. With such resin used, the amount of resin flowing into the gaps in the sheath portions can be made up for by its volume expansion which occurs when it is foamed. But, it is difficult to assure the adhesion between the insulators for the transmission members and the dam resin only by foaming it. To this end, in this invention, the rate at which the resin is foamed and cured is so determined that it progresses to be foamed and cured when the resin injected into the mold intrudes into the gaps between the transmission members within the sheath portions. This causes the fluidity resistance of the dam resin to be increased on intrusion of the dam resin into gaps between the transmission members within the sheath portions, and therefore, the pressure of the resin in the mold to become higher as it is foamed and cured. Thus, the dam resin is tightly forced against the surfaces of the insulators for the transmission members. The tightness between the insulators for the transmission members and the dam resin is assured by curing it on the condition of forcing it against the surfaces of the insulators. Also, if the rate at which the resin is foamed and cured is determined as aforementioned, the length of the cable along which the resin intrudes into the sheath portions is preferably shorter.

Accordingly, in this invention, the dam resin should be one which is foamed and cured in a relatively shorter time after injected into the mold. It may be a two-component resin system consisting of resin such as urethane resin including blowing agent such as Freon, a registered trademark of E. I. DuPont de Nemours & Co. and the like and hardener, for example. As the resin is combined with the hardener, the curing reaction generates heat, which foams the resin by vaporizing the blowing agent. The rate at which the resin is foamed and cured may be controlled by adjusting the amount of catalyst included in the resin.

In order to indicate the rate at which the resin is foamed and cured, there may be used an index of "cream-time". What cream-time means is the period after the two components are mixed until the resin exhibits a creamy state to begin to be foamed by the reaction heat. At the time when the resin begins to be foamed, since the volume of the resin begins to be increased, it can be confirmed visually through a suitable glass container.

With the rate at which the resin used is foamed and cured being indicated by the cream-time, it may be 20 to 60 seconds and preferably 30 to 45 seconds. If the cream-time is less than 20 seconds, then the foaming and curing rate is too high to fully diffuse the resin into the conductor gaps in the mold. Thus, it will be noted that the gas-tight dam cannot be formed. On the other hand, if the cream-time is more than 60 seconds, then the foaming and curing rate is too low so that the length of the cable along which the resin intrudes into the sheath portions becomes longer and so that it is difficult to increase the foaming pressure of the resin in the mold.

In this manner, in this invention, there is used the resin which is foamed and cured in a substantially shorter time. When the curing rate is high, there is a problem of dissolving the conductor insulators caused by the curing. This can be avoided by suitably selecting the type of resin used. The preferable resin used in the invention is one which selfcures on reaction of isocyanate with a compound having reactive hydrogen and is foamed by vaporizing the blowing agent of Freon by the heat on curing reaction.

In the case of urethane resin, water and Freon may be industrially used as the blowing agent. The water is used for utilizing the property of reacting with the hardener of isocyanate to generate carbon dioxide gas while Freon is used for utilizing the property of being vaporized by the heat accompanied by urethane curing reaction. Comparing the two, water foaming is unfavorable in view of the following points. Since the hardener of isocyanate reacts with both water and polyol, when the resin is foamed by reacting water with isocyanate before urethane becomes viscous liquid as the urethane curing reaction progresses to a certain degree, the foams are removed out of the urethane and/or communicate with each other. Thus, it will be noted that urethane reaction should be made earlier than water reaction. But, since urethane is cured, but not foamed if the urethane reaction progresses too much, a cure control agent having a strong virulence such as an organic mercury should be used to control the viscosity of urethane. Also, the products formed by water reaction has a mold removing property poorer than those formed by Freon reaction. On the other hand, in the Freon foaming, since Freon is not vaporized as long as the resin reacts to a certain degree to become a viscous liquid, the reaction and foaming can be more easily controlled.

According to the invention, a gas-tight dam can be produced in a much shorter time and an interference for dam resin is not required to be provided at the sheath ends or can be more simplified, with the result that the productivity can be advantageously much improved.

Although, in the embodiment described hereinjustbelow, no interference for resin is provided at sheath ends of a communication cable, a simple interference may be provided if necessary. For example, in case of a unit twisting communication cable or the like, if there is a relatively large gap between the adjacent units of the cable, a thin rod, swab (rod having a cotton head) or the like may be inserted into the gap.

Although, in the embodiment described hereinjustbelow, there is used foaming urethane resin, it should be noted that the resin to be used is never limited thereto, and may be another resin so long as it has the same property as the foaming urethane resin.

BEST MODE FOR CARRYING OUT THE INVENTION

Figure 1:
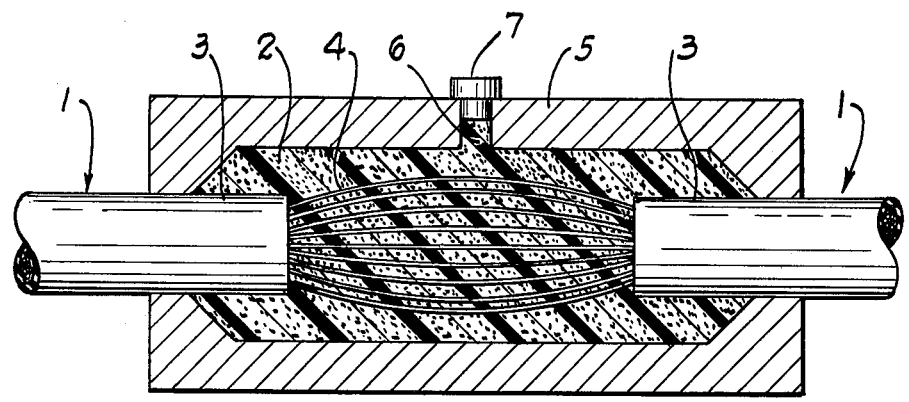
FIG. 1 is a cross sectional view of a dam which is in the course of being produced it in accordance with the method of the invention.

Referring now to the drawing, in order to make a dam 2 at a portion of a communication cable 1, a sheath 3 is stripped at the portion of the cable where the dam is formed to expose transmission members 4 thereto. The exposed portions of the transmission members 4 are untwisted if necessary to ease resin to be introduced into gaps between the transmission members. If the cable has only a few pairs, the operation of untwisting will not be required. The portions of the cable where the dam is to be formed are covered with a mold 5. The mold 5 may be composed of metal and longitudinally divided into two halves. The mold 5 is mounted at both ends on the portions of the sheath 3 so as to tightly engage them. A resin injection port 6 is provided at the center of the mold 5. Resin to form the dam is injected through the injection port 6 into the mold 5 where it is foamed and cured. The injection port 6 is closed by a cap 7 after the resin is injected. After the injected resin completes to be foamed and cured, the mold 5 is separately divided and removed from the cable.

The aforementioned operation was commonly made in connection with all of the examples and the comparisons described later. The communication cables used in the examples and the comparisons were a 800-pair polyethylene insulated, stalpeth sheathed cable having a conductor diameter of 0.4 mm. No interference was provided at the sheath portions in any of the examples and the comparisons.

In each of the examples and the comparisons, on a gastightness test at a normal temperature, such dams as had no variation in gas pressure, when 24 hours elapsed after a gas of 1 kg/cm² was enclosed at 23° C. in one of the cable portions on both sides of the dams, were considered to be accepted. Also, on a thermal cycling test, such dams as had no variation in gas pressure when they were subject to 100 thermal cycles of −20° to 60° C. every two cycles per day after gas of 1 kg/cm² was enclosed at 23° C. in one of the cable portions on both sides of the dams were considered to be accepted.

EXAMPLE 1

There was used as dam resin, two component urethane resin having the following formulation.

| | |
|---|---|
| Resin | |
| TQ-500 (Polymer Polyol of Polypropylene Glycol derivative, Hydroxy value ca. 500 KOH mg/g, viscosity ca. 1200 c.p.s.) (manufactured by Mitsui-Nisso Urethane Company, Japan) | 70 weight parts |
| POP 20/25 (Polymer Polyol of Polypropylene Glycol derivative, Hydroxy value ca. 26 KOH mg/g, viscosity ca. 2000 c.p.s.) (manufactured by Mitsui-Nisso Urethane Company, Japan) | 100 weight parts |
| 1,4-butane diol | 60 weight parts |
| DMBA (N,N′ dimethylbenzylamine) (manufactured by Kao Sekken Company, Japan) | 2 weight parts |
| SA102 (1, 8-diaza-bicyclo(5,4,0) undecene-7.2, ethylhexanate) (manufactured by San-Abbott Company, Japan) | 3 weight parts |
| Freon 11 | 2 weight parts |
| Silicone SH193 (Dialkyl Polysiloxane) (manufactured by Toray Silicone Company, Japan) | 2 weight parts |
| Hardener | |
| Millionate MTL (Carbodiimized Diphenyl Methane Diisocyante, NCO percentage ca. 28, viscosity ca. 45 cps) (manufactured by Nippon Polyurethane Company, Japan) | 335 weight parts |

The "cream-time" of the resin was 35 seconds. After two components were mixed with each other, they were injected into the mold 5 and after that the injection port 6 was closed by the cap 7. The rise-off time of the resin (the time after foaming began until it was completed to increase the volume of the resin) was 90 seconds, and as the mold was removed when 10 minutes elapsed after injection in view of the time for after-cure, it was found that the foaming and curing were completed. In this case, an adhesive plastic film of polyethylene was melted onto the surface of the portion of the sheath 3 within the mold in order to improve the adhesion between the sheath portion and the resin.

Ten dams produced in this manner were subjected to the gas-tightness test at the normal temperature and also to the thermal cycling test. All of the dams were considered to be accepted.

The dams were broken up and the length of the cable portion along which the resin intruded into the sheath portion was 30 to 50 mm when measured. Since the length L along which the sheath 3 was covered with the resin was 60 mm, such intrusion length will not hinder the flexibility of the cable portions adjacent to the dams. The density of the resin foamed and cured within the mold was 1.05 g/cm³ when measured. Since the density of the resin when freely foamed is 0.68 g/cm³, it will be noted that the resin foamed within the mold was cured while it is compressed or pressurized. Since urethane resin does not adhere to polyethylene which the conductor insulators were composed of, it will be understood that the gas-tightness was provided to the dams by forcing the urethane resin against the surfaces of the conductor insulators under foaming pressure. As the result of breaking up the dams, it was not confirmed that the conductor insulators were dissolved.

EXAMPLE 2

| Composition | |
|---|---|
| Resin | |
| TQ-500 | 70 weight parts |
| POP20/25 | 100 weight parts |
| 1,4-butane diol | 60 weight parts |
| DMBA | 1.5 weight parts |
| SA102 | 2.5 weight parts |
| Freon 11 | 1.3 weight parts |
| SH193 | 2 weight parts |
| Hardener | |
| Millionate MTL | 335 weight parts |
| Cream-time | 43 seconds |
| Rise-off time | 120 seconds |
| Demolding time | 15 minutes |
| Gas-tightness test at normal temperature | all accepted (5 dams) |
| Thermal cycling test | all accepted (5 dams) |
| Resin intrusion length into sheath | 40 to 60 mm |
| Density of dam resin | 1.08 g/cm³ |
| Density of resin freely foamed | 0.73 g/cm³ |

EXAMPLE 3

| Composition | |
|---|---|
| Resin | |
| TQ-500 | 70 weight parts |
| POP20/25 | 100 weight parts |
| 1.4 butane diol | 60 weight parts |
| DMBA | 2.5 weight parts |
| SA102 | 3 weight parts |
| Freon 11 | 1.5 weight parts |
| SH193 | 2 weight parts |
| Hardener | |
| Millionate MTL | 335 weight parts |
| Cream-time | 32 seconds |
| Rise-off time | 85 seconds |
| Demolding time | 10 minutes |
| Gas-tightness at normal temperature | all accepted (5 dams) |
| Thermal cycling test | all accepted (5 dams) |
| Resin intrusion length into sheath | 25 to 55 mm |
| Density of dam resin | 0.95 g/cm³ |
| Density of resin freely | 0.52 g/cm³ |

-continued

| Composition | |
|---|---|
| foamed | |

EXAMPLE 4

| Composition | |
|---|---|
| Resin | |
| TQ-500 | 70 weight parts |
| POP20/25 | 100 weight parts |
| 1,4-butane diol | 60 weight parts |
| DMBA | 1.5 weight parts |
| SA102 | 2.5 weight parts |
| Freon 11 | 2 weight parts |
| SH193 | 2 weight parts |
| Hardener | |
| Millionate MTL | 335 weight parts |
| Cream-time | 57 seconds |
| Rise-off time | 130 seconds |
| Demolding time | 20 minutes |
| Gas-tightness test at normal temperature | 5 among 5 dams accepted |
| Thermal cycling test | 4 among 5 dams accepted |
| Resin intrusion length into sheath | 70 to 100 mm |
| Density of dam resin | 1.13 g/cm$^3$ |
| Density of resin freely foamed | 0.78 g/cm$^3$ |

EXAMPLE 5

| Composition | |
|---|---|
| Resin | |
| TQ-500 | 70 weight parts |
| POP20/25 | 100 weight parts |
| 1,4-butane diol | 60 weight parts |
| Polycat 22 (N,N'—Dimethylamino Cyclohexyl Amine 75 percent, N—methyl Dicyclohexyl Amine 25 percent) (manufactured by San-abbott Company, Japan) | 4 weight parts |
| Freon 11 | 2 weight parts |
| SH193 | 1 weight part |
| Hardener | |
| Millionate MTL | 335 weight parts |
| Cream-time | 23 seconds |
| Rise-off time | 55 seconds |
| Demolding time | 5 minutes |
| Gas-tightness test at normal temperature | 5 among 5 dams accepted |
| Thermal cycling test | 3 among 5 dams accepted |
| Resin intrusion length into sheath | 15 to 35 mm |
| Density of dam resin | 0.83 g/cm$^3$ |
| Density of resin freely foamed | 0.48 g/cm$^3$ |

Comparison 1

| Resin | |
|---|---|
| TQ-500 | 70 weight parts |
| POP20/25 | 100 weight parts |
| 1,4-butane diol | 60 weight parts |
| DMBA | 1 weight part |
| SA102 | 1 weight part |
| Freon 11 | 2 weight parts |
| SH193 | 2 weight parts |
| Hardener | |
| Millionate MTL | 335 weight parts |
| Cream-time | 65 seconds |
| Rise-off time | 205 seconds |
| Demolding time | 30 minutes |
| Gas-tightness test at normal temperature | 2 among 5 dams accepted |
| Thermal cycling test | no dam among 2 dams accepted |
| Resin intrusion length | 250 to 300 mm |

-continued

| Composition | |
|---|---|
| into sheath | |
| Density of dam resin | 1.15 g/cm$^3$ |
| Density of resin freely foamed | 0.85 g/cm$^3$ |

Comparison 2

| Resin | |
|---|---|
| TQ-500 | 70 weight parts |
| POP20/25 | 100 weight parts |
| 1,4-butane diol | 60 weight parts |
| Polycat 22 | 3 weight parts |
| SA102 | 3 weight parts |
| Freon 11 | 0.5 weight parts |
| SH193 | 3 weight parts |
| Hardener | |
| Millionate MTL | 335 weight parts |
| Cream time | 9 seconds |
| Rise-off time | 43 seconds |
| Demolding time | 5 minutes |
| Gas-tightness test at normal temperature | nothing accepted (5 dams) |
| Resin intrusion length into sheath | 10 to 20 mm |
| Density of dam resin | 0.65 g/cm$^3$ |
| Density of resin freely foamed | 0.37 g/cm$^3$ |

I claim:

1. A method of producing a dam for a communication cable comprising the steps of exposing transmission members by stripping the sheath of said communication cable, said cable having gaps between the component transmission members within the sheath, covering said exposed portions of said transmission members with a mold and injecting self-curing resin into said mold to cure said resin, characterized in that said self-curing resin is a resin to be cured while being foamed and is urethane which self-cures on reaction of isocyanate with a compound having reactive hydrogen and vaporizes a blowing agent of polychlorofluorocarbon with heat generated in said reaction, said resin having a cream time of 20 to 60 seconds and being foamed in said mold after having been injected into said mold and the mold capped prior to the cream time and having the pressure within the mold increased by increasing the fluidity resistance of said resin as said resin cure progresses when said resin intrudes into gaps between said transmission members within said sheath, which increasing fluidity resistance is caused by an expansion of volume of said resin during foaming whereby said resin is cured under a high pressure.

2. The method of claim 1, wherein said resin intrudes into said gaps about 20 mm during the cream time and is then arrested in intrusion to a maximum of about 80 mm by said increasing fluidity resistance by foaming and curing.

3. A method of producing a gas-tight dam for a gas maintenance communication cable comprising the steps of exposing transmission members by stripping the sheath of the communication cable, the cable having gaps among the component transmission members within the sheath, covering exposed portions of said transmission members with a mold, and injecting a self-curing resin into said mold to cure said resin;
   characterized in that said resin is a resin to be cured while being foamed,
   first selecting a resin and catalyst mix with a cream time sufficiently long so that the resin remains fluid for a time sufficient to permit intrusion of the resin for a short distance into said gaps, and second selecting said resin catalyst mix with a cream time sufficiently short so that the longitudinal flow of the resin longitudinally into said gaps is arrested by the increasing fluidity resistance of said resin in said gaps as said resin cure progresses by the expansion of volume of the resin during foaming, whereby said resin is cured under a high pressure.

4. The method of claim 3, wherein said resin and catalyst mix has a cream time of 20 to 60 seconds.

5. The method of claim 3, wherein said resin is urethane which self-cures on reaction of isocyanate with a compound having reactive hydrogen and vaporizes a blowing agent of polychlorofluorocarbon with heat generated in said reaction.

6. The method of claim 3, wherein said first selecting step is of a mix so that the resin intrudes into said gaps a minimum of about 20 mm.

7. The method of claim 3, wherein said second selecting step is of a mix so that the resin intrudes into said gaps a maximum of about 80 mm.

8. A method of producing a gas-tight dam for a gas maintenance communication cable comprising the steps of exposing transmission members by stripping the sheath of the communication cable, the cable having gaps among the component transmission members within the sheath, covering said exposed portions of said transmission members with a mold, and injecting a self-curing resin into said mold to cure said resin, characterized in that said resin is urethane which self-cures on reaction of isocyanate with a compound having reactive hydrogen and vaporizes a foaming agent of polychlorofluorocarbon with heat generated in said reaction, selecting the proportions of resin and catalyst mix for a cream time of at least about 20 seconds so that the resin remains fluid for a time sufficient to permit intrusion of the resin for about 20 mm into said gaps, and second selecting said resin and catalyst mix proportions for a cream time of a maximum of about 60 seconds so that the flow of the resin longitudinally into said gaps is arrested to a maximum of about 80 mm by the increasing fluidity resistance of said resin in said gaps as said resin cure progresses by the expansion of volume of the resin during foaming, whereby said resin is cured under a high pressure.

* * * * *